Nov. 10, 1964 T. MOLLINGA 3,156,832

HIGHLY LINEAR RAMP SIGNAL GENERATOR

Filed April 2, 1962

INVENTOR.
THOMAS MOLLINGA

BY

Christie, Parker & Hale
ATTORNEYS.

United States Patent Office 3,156,832

Patented Nov. 10, 1964

3,156,832

HIGHLY LINEAR RAMP SIGNAL GENERATOR

Thomas Mollinga, Sierra Madre, Calif., assignor to Burroughs Corporation, Detroit, Mich., a corporation of Michigan Filed Apr. 2, 1962, Ser. No. 184,158
5 Claims. (Cl. 307—88.5)

Figure 1:
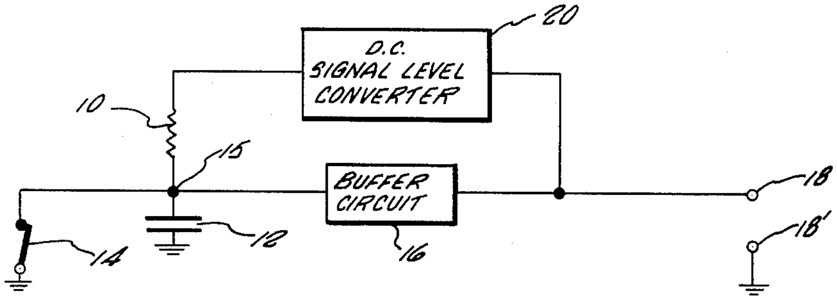

This invention is directed to improvements in electrical circuits for generating voltage signals which change linearly with time, and, more particularly, to a novel, highly linear, ramp signal generator.

Electrical circuits for generating voltage signals which change linearly with time are commonly termed ramp signal generators. Such circuits find wide use in electronic systems as well as in electronic test equipment. For example, ramp signal generators are utilized to determine and/or check the width as well as the repetition rate of pulse signals and are particularly useful in the conversion from digital to analog signals in electronic computers.

In general, ramp signal generators basically include a resistor-capacitor timing circuit coupled in series between a source of potential and ground, and a normally closed electronic switch shunting the time capacitor. The switch opens in response to a pulse signal applied thereto to initiate a charging of the capacitor. In this manner the voltage on the capacitor provides an indication of the time duration of the pulse signals applied to the electronic switch. However, the capacitor in charging through the timing resistor charges at an exponential rate. Thus, in order for the voltage on the capacitor to accurately represent the time duration of the pulse signals it is necessary to linearize the charging rate of the timing capacitor. One method of linearizing the charging rate of the timing capacitor has been to couple a capacitive network between the output, which is taken across the timing capacitor, and the timing resistor. In such an arrangement voltage changes at the output are reflected through the capacitive network to the timing resistor to maintain a substantially constant voltage across the timing resistor and hence provide a substantially constant charging current to the capacitor. However, since the capacitive network is a frequency-sensitive arrangement, changes in the repetition rate of the pulse signals applied to the switch produce small changes in the voltage developed across the timing resistor. Variations in the voltage across the timing resistor, in turn, result in changes in the charging current and hence in the charging rate of the timing capacitor. Accordingly, as the frequency of the pulse signals varies, the slope of the output voltage also varies to introduce serious inaccuracies in the detection of the repetition rate of pulse signals as well as in the conversion from digital to analog signals.

In view of the above, the present invention provides an improved ramp signal generator which is highly linear over a wide frequency range.

To accomplish this, the ramp signal generator of the present invention in a basic form includes a timing resistor coupled in series with a timing capacitor. The timing capacitor is coupled to a source of reference potential and is shunted by a normally closed switch. The switch may be manually, or, more preferably, signal controlled to open in response to, and during the time duration of, an electrical input signal applied thereto. Coupling the timing capacitor to an output means is a buffer network which effectively isolates the timing circuit from electrical loads coupled to the output means. Connected between the output and the timing resistor is a direct current signal level converter. The signal level converter maintains a predetermined direct current voltage across the timing resistor to provide a constant charging current to the capacitor when the switch is open.

Since the signal level converter is frequency independent, the ramp voltage signal developed at the output means is highly linear as well as being substantially independent of the rate at which the switch is opened and closed in response to electrical signals applied thereto.

Figure 2:
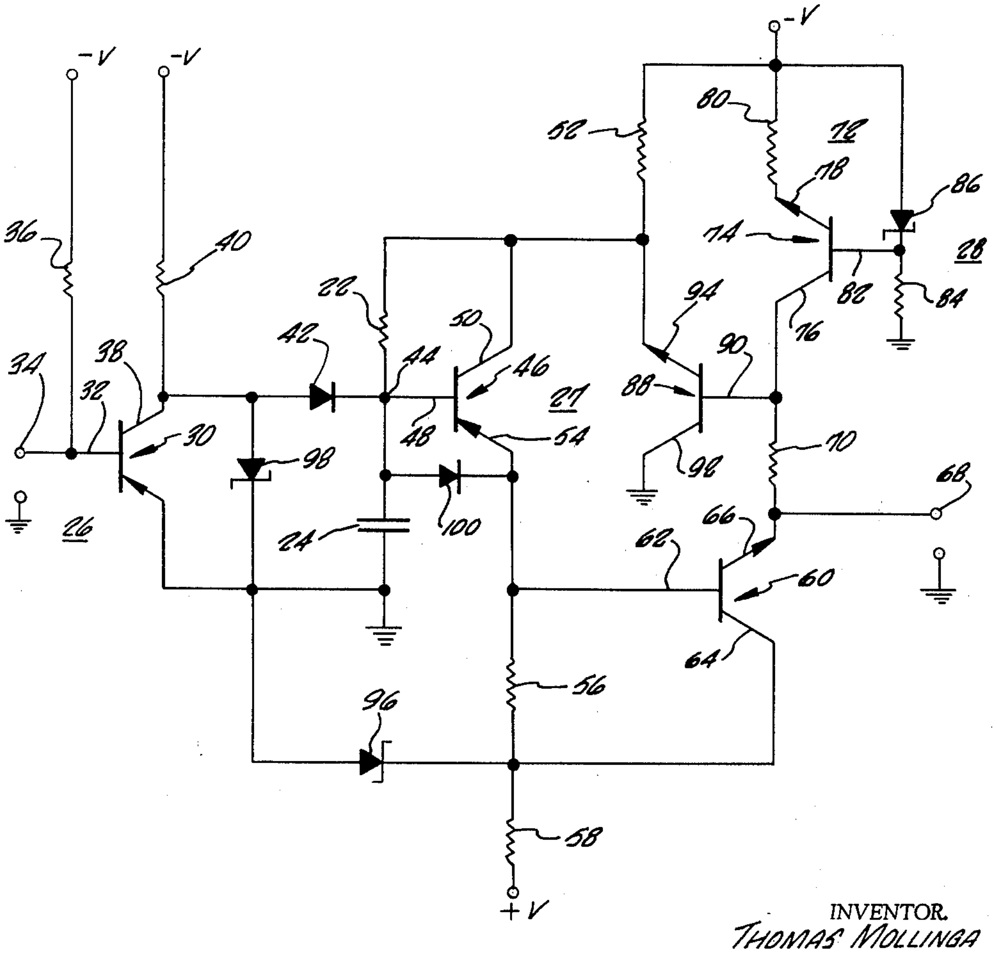

The above, as well as other features of the present invention, may be more clearly understood by reference to the following detailed description when considered with the drawings, in which:

FIGURE 1 is a schematic, block diagram of a basic form of the ramp signal generator of the present invention; and FIGURE 2 is a schematic circuit representation of a preferred form of the ramp signal generator.

As represented in FIGURE 1, the ramp signal generator of the present invention basically includes a timing resistor 10 coupled in series with a timing capacitor 12. The timing capacitor 12 is connected to a source of reference potential, indicated as ground, and is shunted by a normally closed switch, illustrated as 14. The switch 14 may be either manually, or, more preferably, signal controlled to open automatically in response to, and during the time duration of, an electrical signal pulse applied thereto.

Coupled to a junction 15 of the timing resistor 10 and the timing capacitor 12 is a buffer circuit 16. The buffer circuit 16, in turn, is coupled to an output terminal 18 and functions to effectively isolate the timing circuit from the output terminals 18 and 18'. In this regard, the buffer circuit 16 is preferably an impedance transforming network having a high input impedance and a low output impedance. Thus, electrical loads connected to the output terminals 18 and 18' have little, if any, effect upon the charging of the capacitor 12 and the voltage at the output terminal 18 equals the voltage at the junction 15.

Coupled between the output terminal 18 and the timing resistor 10 is a direct current signal level converter 20. The signal level converter 20 is a frequency independent network and functions to maintain a predetermined direct current voltage difference between the output terminal 18 and the timing resistor 10. Since with the buffer circuit 16 the voltage at the output terminal 18 equals the voltage at the junction 15, the signal level converter 20 also maintains a constant direct current voltage across the timing resistor 10 irrespective of changes in the voltage appearing at the output terminal 18. Accordingly, a constant charging current flows through the timing resistor 10 to charge the timing capacitor 12 when the switch 14 is open.

In this manner, the capacitor 12 charges linearly to produce an output voltage between the output terminals 18 and 18' which changes at a linear rate during the time the switch 14 is open. Also, since the signal level converter 20 is a frequency independent network, changes in the rate at which the switch 14 is opened and closed do not effect the voltage across the timing resistor 10 nor the rate at which the capacitor 12 is charged. Thus, the slope of the ramp voltage signal is linear over a wide frequency range of input signals applied to the switch 14 to allow the magnitude of the ramp signal to provide an accurate indication of the repetition rate of the input signals applied to the switch.

A preferred circuit arrangement for developing such a linear ramp signal is illustrated in FIGURE 2. Similar to the basic form of the present invention, the preferred circuit embodiment includes a timing resistor 22, a timing capacitor 24, a switch 26, a buffer circuit 27 and a direct current signal level converter 28, connected substantially as described in connection with FIGURE 1. In particular, the timing resistor 22 is coupled in series with the timing capacitor 24 and a source of reference potential represented as ground.

The switch 26, is a transistor switch including PNP type transistor 30 arranged in a grounded emitter configuration. The base 32 of the transistor 30 is coupled to an input terminal 34 and through a biasing resistor 36 to a source of negative potential —V. The collector 38 of the transistor 30 is coupled through a biasing resistor 40 to the source of negative potential represented as —V and through a diode 42 to a junction 44 of the timing resistor 22 and a timing capacitor 24. Due to the biasing provided by the potential source —V as well as the biasing resistors 36 and 40, the transistor 30 is normally conductive to provide a normally closed switch shunting the timing capacitor 24.

The buffer circuit 27, as illustrated, includes a PNP type transistor 46 having its base terminal 48 coupled to the junction 44, its collector terminal 50 coupled through a biasing resistor 52 to the source of negative potential —V and its emitter terminal 54 coupled through a resistor 56 and a resistor 58 to a source of positive potential +V. In this manner the transistor 46 is biased to a normally conductive state and operates as an emitter follower transistor configuration. Accordingly, the transistor 46 functions as an impedance transforming network having a high input impedance at its base terminal 48 and a low output impedance at its emitter terminal 54. Due to the impedance transforming function of the transistor 46 the timing circuit, comprising the timing resistor 22 and the timing capacitor 24, is effectively isolated from the output circuit portion of the ramp signal generator. Thus electrical loads coupled to the output circuit are prevented from effecting the charging rate of the capacitor 24 to thereby maintain the linearity of the ramp voltage developed by the present invention.

The direct current signal level converter 28, as represented, preferably is of a form similar to the high speed signal level converter described in detail in the co-pending patent application, Serial No. 156,177 filed January 9, 1962 and assigned to the same assignee as the present invention. The signal level converter 28 comprises a NPN type transistor 60 having its base terminal 62 coupled to the emitter 54 of the transistor 46, its collector terminal 64 coupled to a junction of the resistors 56 and 58 and its emitter 66 coupled to an output terminal 68 for the ramp signal generator. Coupled to the emitter 66 is a resistor 70. Connected to the resistor 70 is a constant current source represented generally as 72.

Preferably, the constant current source comprises a transistor 74 having its collector terminal 76 connected to the resistor 70, its emitter terminal 78 connected by a resistor 80 to the source of negative potential —V and its base terminal 82 connected to a junction of a resistor 84 and the cathode of a zener diode 86. The resistor 84 is coupled to ground while the zener diode is coupled to the source of negative potential —V. The zener diode 86 functions to fix the potential across the resistor 80. Thus, a constant current flows to the source of negative potential from the resistor 70 through the emitter-collector circuit of the transistor 74 and the resistor 80.

Since a constant current flows through the resistor 70 a constant direct current voltage drop is developed thereacross, i.e. between the collector 76 of the transistor 74 and the emitter 66 of the transistor 60. Also, by the coupling of the resistor 70 to the constant current source 72, the transistor 60 is biased to a normally conductive state and functions as an emitter follower. The transistor 60 thus possesses a high input impedance and a low output impedance.

Since the transistors 46 and 60 are both arranged in emitter follower configurations, changes in potential at the base 48 of the transistor 46, are reflected at the emitter 54 to the base 62, and result in like changes of potential at the emitter 66 of the transistor 60. Accordingly, as the potential at the base 48 changes with the charging of the capacitor 24, the potential at the emitter 66 and hence at the output terminal 68 changes in a like manner. Further, since a constant current flows through the resistor 70 to effect a constant direct current voltage drop thereacross the change in potential at the emitter 66 is reflected at each point along the resistor 70 to the junction of the resistor 70 and the collector 76 of the transistor 74.

By way of example only, the value of the resistor 70 may be such as to effect a three volt voltage drop between the emitter 66 and the collector 76. Thus, as the voltage across the capacitor 24 increases or decreases, the voltage at the emitter 66 and the collector 76 varies in a like manner separated in direct current signal level by the three volt voltage drop across the resistor 70.

Coupled to the junction of the resistor 70 and the collector 76 is a NPN type transistor 88. The transistor 88 includes a base terminal 90 coupled to the junction of the resistor 70 and the collector 76, a collector terminal 92 connected to ground and an emitter terminal 94 coupled through the biasing resistor 52 to the source of negative potential —V. Thus, the transistor 88 is arranged in an emitter follower configuration and due to the biasing provided by the source of negative potential and the biasing resistor 52, is biased to a normally conductive state.

Since the transistor 88 is arranged in a grounded emitter configuration, changes in potential at the base terminal 90 are reflected at the emitter terminal 94. Thus, as the potential at the emitter 66 changes in response to changes in the voltage across the capacitor 24, the potential at the emitter 94 of the transistor 88 changes in a like manner and differs from the potential at the emitter 66 by the voltage drop across the resistor 70, i.e. three volts. Since the emitter 94 is coupled to the timing resistor 22, the voltage drop across the resistor 22 is maintained at the magnitude of the voltage drop across the resistor 70 regardless of changes in the magnitude of the voltage across the capacitor 24. In this manner a constant current flows through the resistor 22 to charge the timing capacitor 24 at a linear rate when the switch 26 is open.

Considering the overall operation of the ramp signal generator, when a positive-going pulse signal is applied to the input terminal 34, the base terminal 32 is biased positive relative to the emitter terminal of the transistor 30. This causes the transistor 30 to cut off and effectively opens the switch 26. The switch 26 remains open during the time duration of the input signal applied to the input terminal 34. With the switch open, the diode 42, which effectively isolates the timing circuit from the switch 26, is back biased and a charging current flows from ground through the timing capacitor 24 and the timing resistor 22. Since the voltage across the timing resistor 22 is maintained at a constant value, the charging current is constant and charges the capacitor 24 at a linear rate. As the capacitor 24 charges the voltage developed thereacross is applied to the base 48 of the transistor 46. A like change in voltage occurs at the emitter terminal 66 and hence at the output terminal 68. Due to the signal level converter configuration 28, a similar voltage change occurs at the emitter terminal of the transistor 88. Accordingly, like changes in voltage occur at the junction 44 and the emitter 94 to maintain a constant voltage drop across the timing resistor 22. In this manner, a constant current continues to flow through the timing resistor 22 to charge the timing capacitor 24 at a linear rate during the time which the switch 26 is open.

As described in detail in the aforementioned co-pending patent application, the direct current signal level converter 28 is substantially frequency independent and posseses a high input impedance and a low output impedance. Accordingly, the signal level converter has a minimal loading effect upon the overall circuit of the ramp signal generator and maintains a constant voltage drop across the timing resistor 22 irrespective of changes in the rate at which the switch 26 is opened and closed in response to electrical signals applied to the input terminal 34. Accordingly, the linearity of the ramp signal generated at the output 68 is maintained over a wide frequency range of input signals extending far beyond the capabilities of the prior art ramp signal generators.

To further stabilize the ramp signal generator, a zener diode 96 is coupled between ground and a junction of the resistors 56 and 58. The zener diode 96 functions to fix the voltage at the junction of the resistors 56 and 58. In this manner the voltage across the resistor 56 and hence the current flowing through the emitter-collector circuit of the transistor 46 is substantially unaffected by fluctuations in +V.

Preferably, the valve of the emitter resistor 56 is made quite large, thereby allowing only a small emitter-collector current to flow in the transistor 46. Thus, since the base current flowing in the base 48 is substantially equal to the emitter current divided by $\beta$ for the transistor 46, which may be of the order of thirty, the base current is also extremely small. Accordingly, substantially all of the charging current flows through the timing capacitor 24 to maintain a linear charging rate for the capacitor 24.

Further, by a connection of the collector 50 to the emitter 94 of the transistor 88, a constant voltage is maintained between the base and collector of the transistor 46. Thus, a constant impedance is likewise maintained between the base and collector, thereby eliminating possible variations in the charging rate of the capacitor 24 with changes in the conductivity of the transistor 46. Also, since the voltages at the base 48 and the collector 50 of the transistor 46 change simultaneously, undesired effects of stray capacitance between the base and collector are effectively eliminated.

As previously described, the constant current source 72 includes a transistor 74 which is maintained in a conductive state. In order for the transistor 74 to effectuate the generation of a constant current it is necessary to prevent the transistor 74 from going into saturation. Thus, the voltage drop between the base 82 and the collector 76 of the transistor 74 should not become less than one volt. Since the voltage at the collector 76 is determined by the voltage appearing at the emitter 66 of the transistor 60 which, in turn, stems from the voltage at the base 48 of the transistor 46, such control is maintained by a zener diode 98 coupled between ground and the collector 38 of the transistor 30. The zener diode 98 fixes the direct current voltage at the collector 38. When the zener diode 98 breaks down, in response to an opening of the switch 26, the diode 42 is reverse biased. As the capacitor 24 charges from ground the voltage at the junction 44 approaches the breakdown voltage of the zener diode 98. When this occurs the diode 42 is again forward biased to limit the potential at the base terminal 48. By proper choice of the zener diode 98 the voltage on the base 48 is limited such that a voltage drop of at least one volt is maintained between the base and emitter of the transistor 74, the voltage appearing at the base terminal 82 being controlled by the source of potential —V and the zener diode 86.

For small values of the timing capacitor 24, the timing capacitor 24 will discharge rapidly when the switch 26 is closed. When the switch 26, under these conditions, is opening and closing at a high rate, the stray capacitance at the emitter 54 of the transistor 46 cannot discharge rapidly enough and thereby effectuates a cutting off of the transistor 46. To prevent such an occurrence a diode 100 is coupled between the base 48 and the emitter 54 to provide a discharge path for the stray capacitance.

It is also to be noted that in the preferred embodiment the transistor 46 is of a complementary type relative to the transistors 60, 74 and 88. This provides both compensation of the emitter to base voltage drops, which in these transistors are in opposite directions, as well as a compensation of changes in the transistors with variations in temperature, thereby aiding in the effectuating of an overall linear and stable design for the ramp signal generator of the present invention.

What is claimed is:

1. A generator for generating a ramp signal in response to an input initiating signal, comprising:
 a first resistor;
 a timing capacitor coupled between a source of reference potential and the first resistor;
 a normally closed switch coupled between the source of reference potential and a junction of the first resistor and the timing capacitor, the switch being adapted to open in response to an input initiating signal;
 a first transistor arranged in an emitter follower configuration and having its base terminal coupled to the junction of the first resistor and the timing capacitor;
 means for biasing the first transistor to a normally conductive state;
 a second transistor having its base terminal coupled to the emitter of the first transistor and its emitter terminal coupled to an output means;
 means for biasing the second transistor to a normally conductive state;
 a constant current source;
 a second resistor coupled between the output means and the constant current source;
 a third transistor arranged in an emitter follower configuration having its base terminal coupled to a junction of the second resistor and the constant current source and its emitter terminal coupled to the first resistor;
 and means for biasing the third transistor to a normally conductive state, whereby a constant voltage is maintained across the first resistor to provide a constant charging current to the timing capacitor when the switch is open.

2. The apparatus defined in claim 1 wherein the collector of the first transistor is coupled to the emitter of the third transistor.

3. The apparatus defined in claim 1 including a zener diode coupled between the source of reference potential and the base of the first transistor for limiting the voltage at the base of the first transistor.

4. The apparatus defined in claim 1 wherein the means for biasing the first transistor to a conductive state includes a source of biasing potential and first and second biasing resistors coupled in series between the source and the emitter of the first transistor and wherein the apparatus includes a zener diode coupled between the source of reference potential and a junction of the first and second biasing resistors such that variations in the source of biasing potential do not effect the voltage at the emitter of the first transistor.

5. The apparatus defined in claim 1 wherein the first transistor is of a complementary type relative to the second and third transistors.

References Cited in the file of this patent

UNITED STATES PATENTS

| | | |
|---|---|---|
| 2,933,623 | Jones | Apr. 19, 1960 |
| 2,954,504 | Saudinaitis | Sept. 27, 1960 |